March 8, 1932. C. H. STEERE 1,848,394
PEANUT HARVESTER
Filed April 7, 1931 5 Sheets-Sheet 1

Inventor
C. H. Steere
By Watson E. Coleman
Attorney

March 8, 1932.   C. H. STEERE   1,848,394
PEANUT HARVESTER
Filed April 7, 1931   5 Sheets-Sheet 3

Inventor
C. H. Steere
By Watson E. Coleman
Attorney

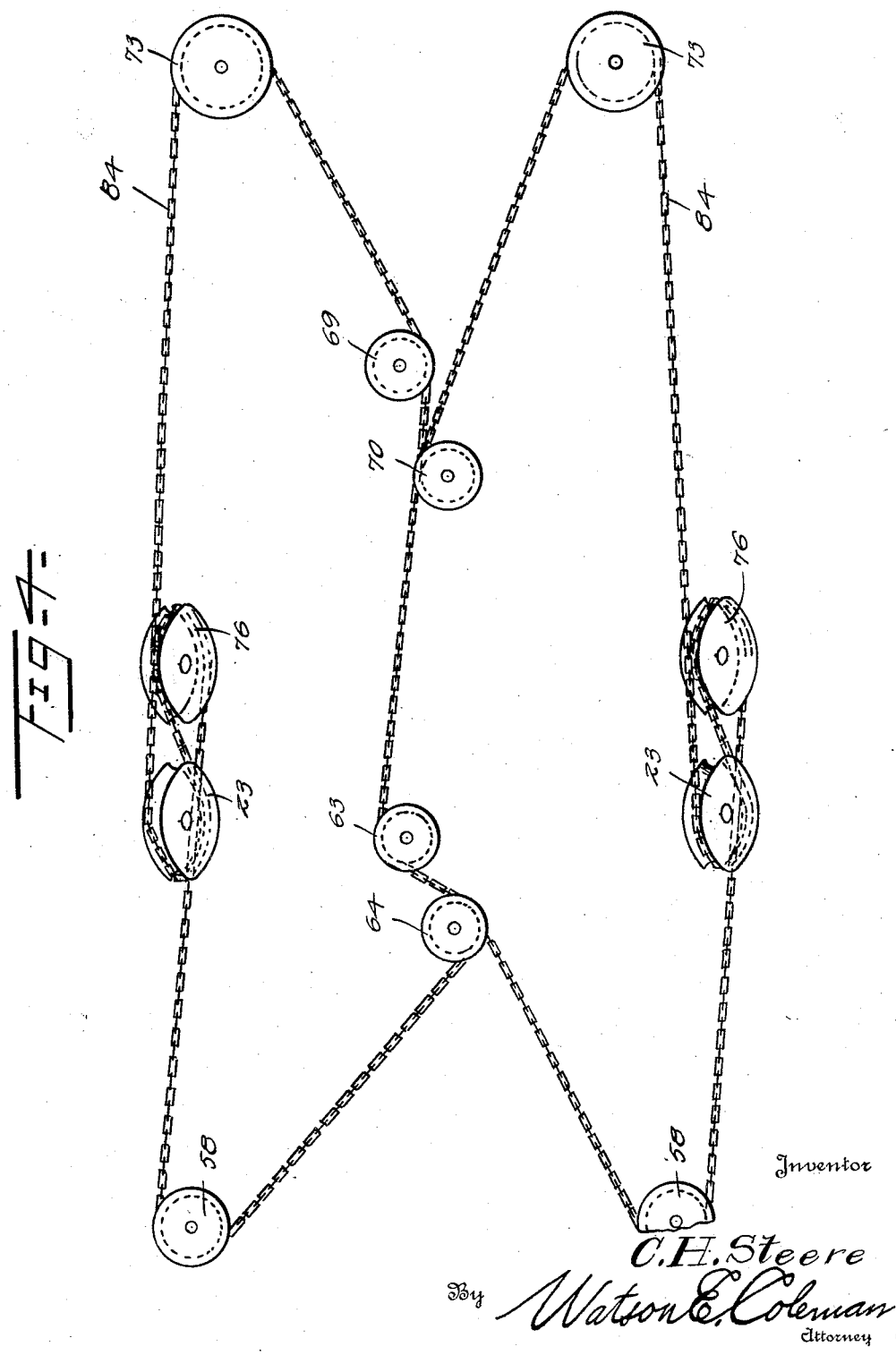

March 8, 1932.      C. H. STEERE      1,848,394
PEANUT HARVESTER
Filed April 7, 1931      5 Sheets-Sheet 5
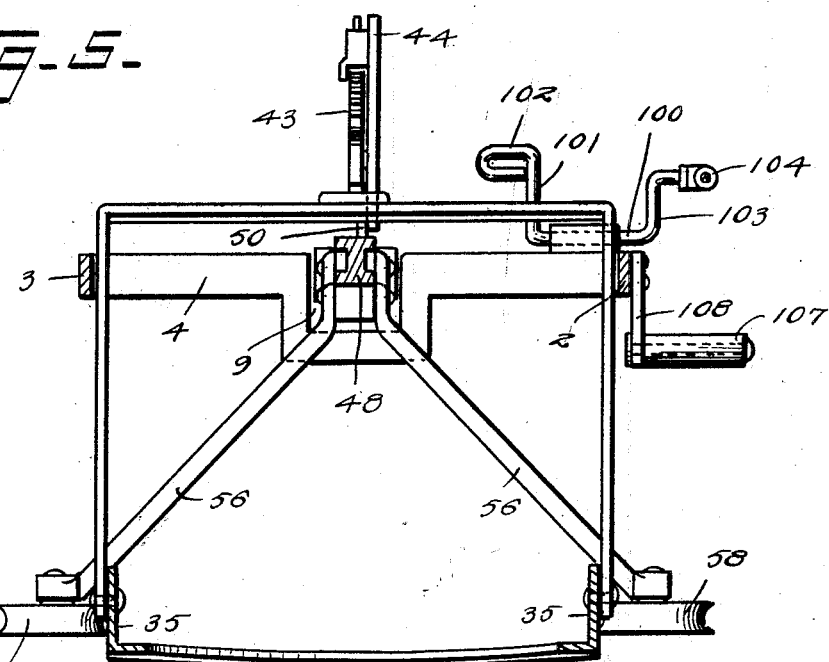
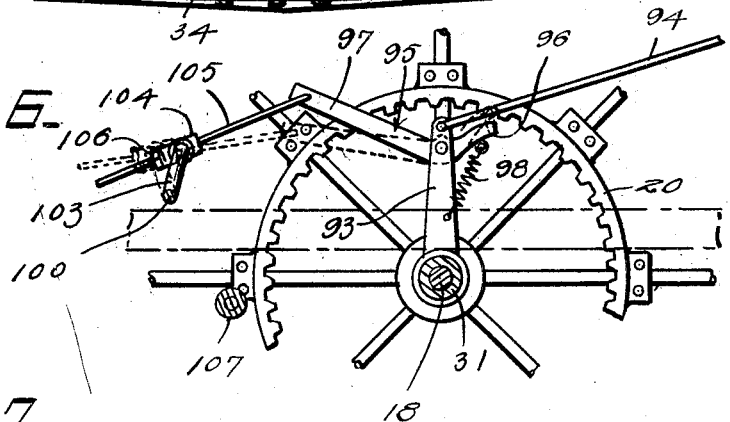
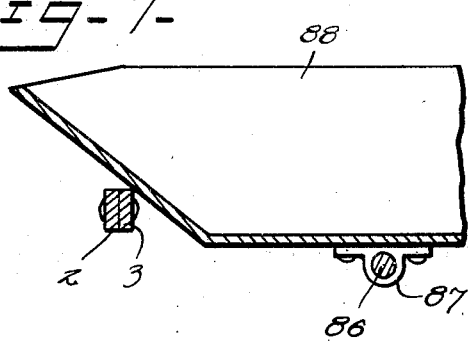
Inventor
C. H. Steere
By Watson E. Coleman
Attorney Patented Mar. 8, 1932

1,848,394

UNITED STATES PATENT OFFICE

CHARLES H. STEERE, OF PETERSBURG, VIRGINIA, ASSIGNOR TO APPOMATTOX IRON WORKS AND SUPPLY CO. INC., OF PETERSBURG, VIRGINIA, A CORPORATION OF VIRGINIA

PEANUT HARVESTER

Application filed April 7, 1931. Serial No. 528,400.

This invention relates to the class of harvesting machines and pertains particularly to a machine for harvesting peanuts, although it may be employed for other harvesting operations where the plants harvested are cut close to or below the ground surface and the tops thereof collected.

The primary object of the present invention is to provide a machine primarily designed for harvesting peanuts, by means of which the stalks of the plants may be readily severed below the point where the peanuts are attached thereto, and the tops of the plants with the attached peanuts picked up and conveyed to a receiving receptacle.

Another object of the invention is to provide a novel means for gripping the tops of the plants after the stalks have been severed, and pulling the same from the ground and carrying them to a receiving receptacle into which they are discharged.

A still further object of the invention is to provide a novel means for automatically regulating the degree of pressure exerted upon the plant tops by the pick-up mechanism, so that an increase in the amount of tops gathered by the pick-up means will not result in the cutting or severing of the tops thereby, but the pick-up means will be slackened sufficiently to prevent this without losing its hold upon the plants.

A still further object of the invention is to provide a novel means for dumping a load of plants from the receiving receptacle, by throwing certain tripping mechanism into engagement with a part of the harvester mechanism which is in constant movement while the machine is in operation.

Still another object of the invention is to provide a novel means for mounting and adjusting the plant stalk cutting mechanism and the plant top pick-up mechanism, so that one thereof may be shifted independently of the other or both may be shifted simultaneously as desired.

Other objects and advantages of the present invention will become apparent as the description of the same proceeds, and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 4 is a diagrammatic view in plan of the plant top pick-up mechanism.

Figure 5 is a transverse sectional view taken substantially upon the line 5—5 of Figure 2 looking in the direction of the arrows, parts of the mechanism traversed by this section line being left out for the better illustration of certain other parts.

Figure 6 is a detailed sectional view taken on the line 6—6 of Figure 3, illustrating the tripping mechanism for the plant receiving receptacle.

Figure 7 is a vertical sectional view taken on the line 7—7 of Figure 1.

Figure 8 is a sectional view taken substantially upon the line 8—8 of Figure 3.

Figure 9 is a view in elevation of the upper end of the conveyor carrying beam.

Figure 1:
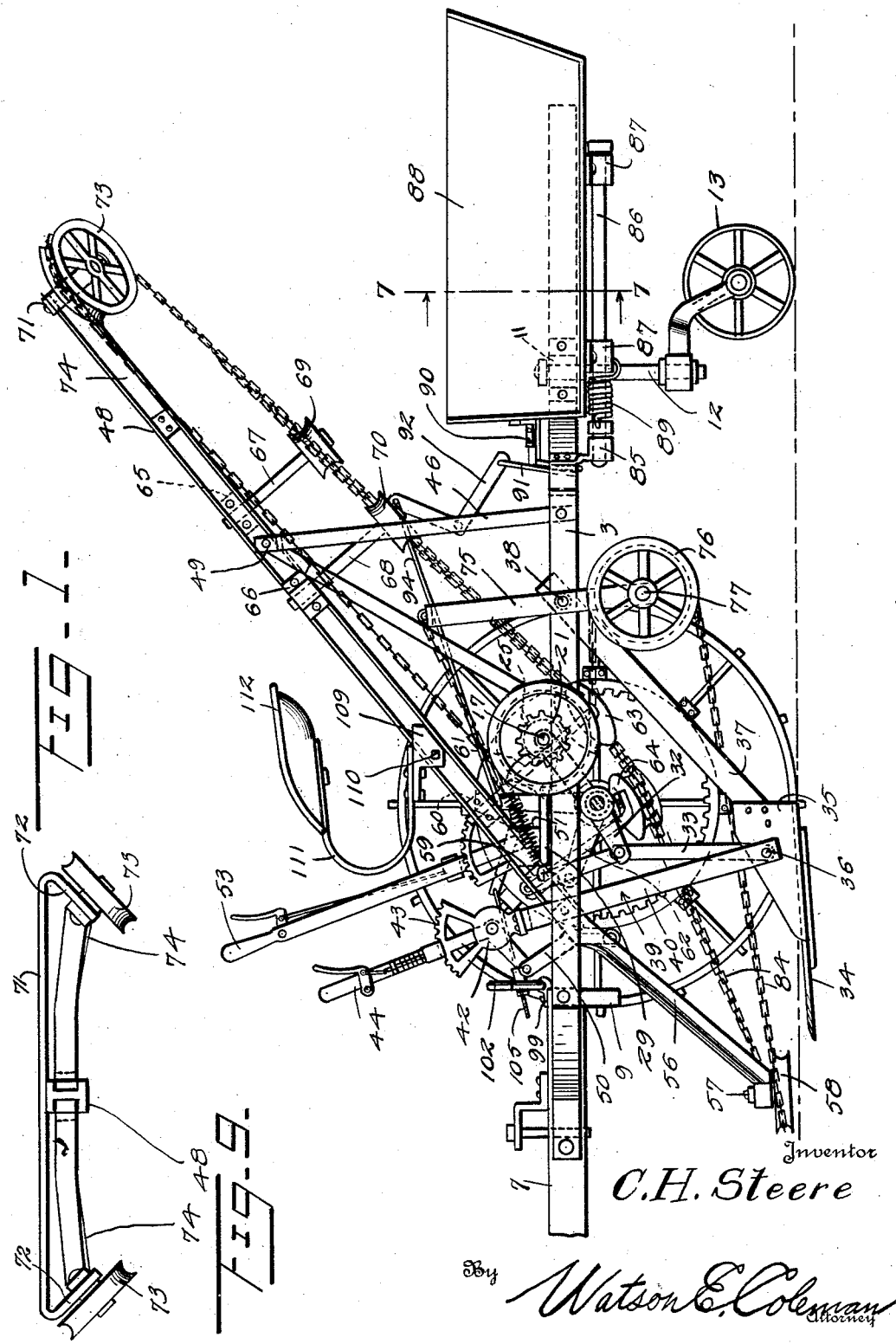
Figure 1 is a view in side elevation of the machine embodying the present invention, with the nearest traction wheel removed from its supporting axle to more clearly show the relation of the parts of the mechanism.

Referring now more particularly to the drawings, wherein like numerals of reference indicate corresponding parts throughout the several views, the numeral 1 indicates generally the frame structure of the present invention. This frame includes the two spaced parallel side beams 2 and 3 which, adjacent their forward ends, are connected by the cross beam 4 and which have their forward ends beyond the beam 4 turned inwardly, as at 5, and terminating in the relatively closely spaced forwardly extending parallel tips 6 between which is positioned the rear end of a draft tongue 7.

The pivot bolt 8 passes transversely through the tongue 7 and through the ends 6 of the frame members and joins these units together. The rear end of the tongue 7 positions in a depending offset 9 which is formed in the cross beam 4 so as to permit the draft tongue to oscillate vertically.

Figure 3:
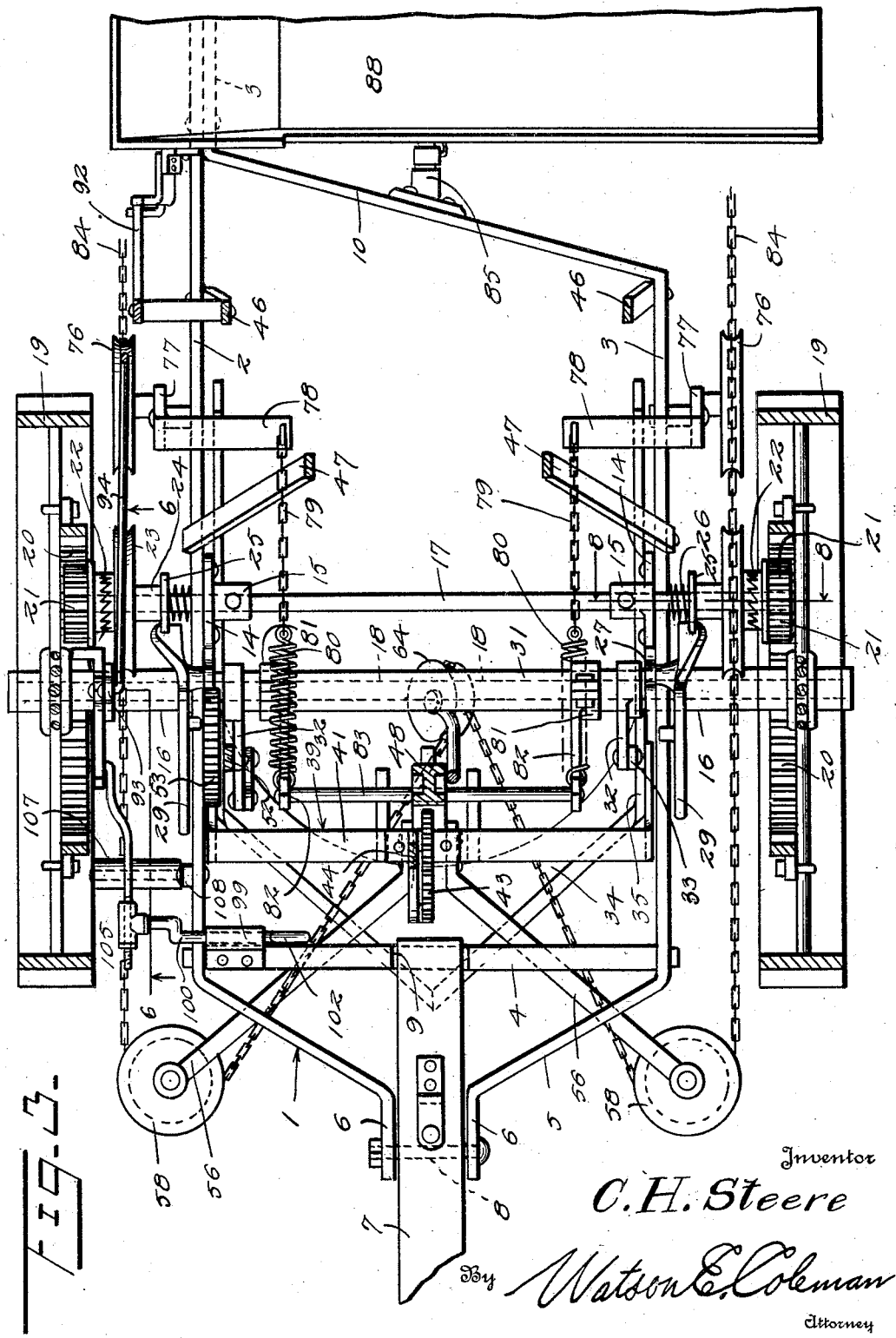
Figure 3 is a horizontal sectional view taken on the line 3—3 of Figure 2.

At the back part of the machine the side beam 3 extends oblique across to the other beam 2, as indicated at 10, and positioned against the beam 2 to which it is joined, as illustrated in Figure 3. The joined rear ends of the beams 2 and 3 have mounted thereon a bearing 11 in which is positioned the upper end of the vertical axle 12 for a caster wheel 13.

Upon substantially the transverse center of the machine frame there is secured to each of the beams 2 and 3 a plate 14 which carries two bearing hubs 15 and 16.

A pair of shafts 17 and 18 extend transversely of the machine, the shaft 17 being mounted in the hubs 15, while the shaft 18 is mounted in the hubs 16. Due to the fact that the hubs 15 are disposed in a plane above the frame and the hubs 16 are disposed in a plane below the frame, it will be seen that these shafts will also be in vertically spaced planes. The shaft 18 constitutes the axle for the machine and its ends extend a substantial distance beyond the sides of the frame and receive thereon the hubs of the traction wheels 19.

Each of the traction wheels 19 carries upon its inner side a relatively large ring gear 20 and each end of the shaft 17 has mounted thereon a pinion gear 21 which is disposed within and meshes with the adjacent ring gear 20.

The inner face of each pinion gear 21 is designed to form one element of a tooth clutch 22, the other element of the clutch forming an integral part of a sheave wheel 23 which is mounted for free rotation upon the shaft 17. Each of these sheave wheels 23 has extending from its inner face a collar 24, about the inner end of which is formed a flange 25. Surrounding the shaft 17 at each end and disposed between a flange 25 and the adjacent frame beam, is a spring 26 which normally maintains the parts of the clutch 22 in engagement with one another.

Each of the bearing carrying plates 14 is formed to provide an apertured ear 27, which projects above the adjacent frame beam and carries a pivot pin 28 upon which is mounted a clutch operating lever 29. This lever 29 carries a cam plate 30 which bears against the outer side of the adjacent flange 25, as illustrated in Figure 8, so that when the lever 29 is oscillated in the proper direction, the cam surface of this plate 30 will bear against the flange 25 and shift the collar 24 and the sheave wheel and clutch element carried thereby so as to disengage the clutch 22 and thus stop the transmission of power from the traction wheels of the machine to the mechanism thereof.

Surrounding the axle shaft 18, between the side beams 2 and 3 of the frame, is a sleeve 31 upon each end of which is rigidly mounted a forwardly extending arm 32. Each of these arms 32 has pivotally attached thereto one end of a depending link 33.

Disposed below and forwardly of the axle is a relatively broad flat cutter plow 34 which is in the form of a V, the tip or point of which is directed forwardly. At the end of each side of the cutter plow 34 is an upturned plate 35 to which is attached, by means of the pivot bolt 36, the other end of the adjacent depending link 33.

Connected to each of the upstanding portions or wings 35 of the plow, is one end of a brace beam 37 which extends upwardly and rearwardly across the inner face of the adjacent frame beam, to which it is pivotally attached by a bolt or pin 38.

Disposed within the frame above the plow 34 is an inverted substantially U-shaped frame 39, the free end of each of the side members 40 of which are pivotally attached to a wing 35 of the plow by the pivot bolt 36 therein which also attaches the link 33 thereto. The transverse yoke portion of the frame 39 is indicated by the numeral 41 and this has bolted thereto a bracket 42 which carries a toothed segment 43 and a hand lever 44. The usual spring actuated pawl mechanism is carried by this hand lever 44 for engagement with the teeth of the rack segment 43 to hold the lever in a set postion, and the lower end of this lever has extending, at an angle therefrom, the arm 45.

At the rear of the frame structure there are mounted upon the beams 2 and 3, the upwardly and inwardly inclined supports 46, the adjacent upper ends of which are formed to assume a spaced parallel relation. These supports are braced by the arms 47 which are connected at their upper ends to the supports and which have their lower ends joined to the frame beams, as illustrated in Figures 2 and 3.

Disposed between the spaced upper end portions of the supports 46 is an elongated beam 48 which is preferably in the form of an I. The sides of this beam are suitably filled out between the ends of the supports 46 and the supports are pivotally secured to the beam 48 by the pivot pin 49. This beam 48 normally assumes an angle of approximately forty-five degrees with respect to the plane of the frame and its forward or lower end extends through the frame 39 and carries the rigid upstanding arm 50 to the upper end of which the arm 45 is pivotally attached. It will thus be seen that the actuation of the lever 44 will cause the oscillation of the beam 48.

At one side of the machine there is mounted a plate 51 which carries an arcuate rack segment 52. Pivotally mounted upon this plate at a point concentric with the arcuate segment 52 is a hand lever 53. The lower end of this lever 53 carries a rigid angularly disposed arm 54 to which is pivotally attached one end of a link 55, the other end of this link being pivotally attached to the end of the adjacent arm 32. From this it will be seen that upon oscillation of the lever 53 the plow 34 will be shifted vertically and since this plow carries the frame 39, which is connected with the forward end of the beam 48, the beam will also be oscillated. However, by the oscillation of the lever 44 only the beam 48 will be shifted, the plow maintaining its position.

Figure 2:
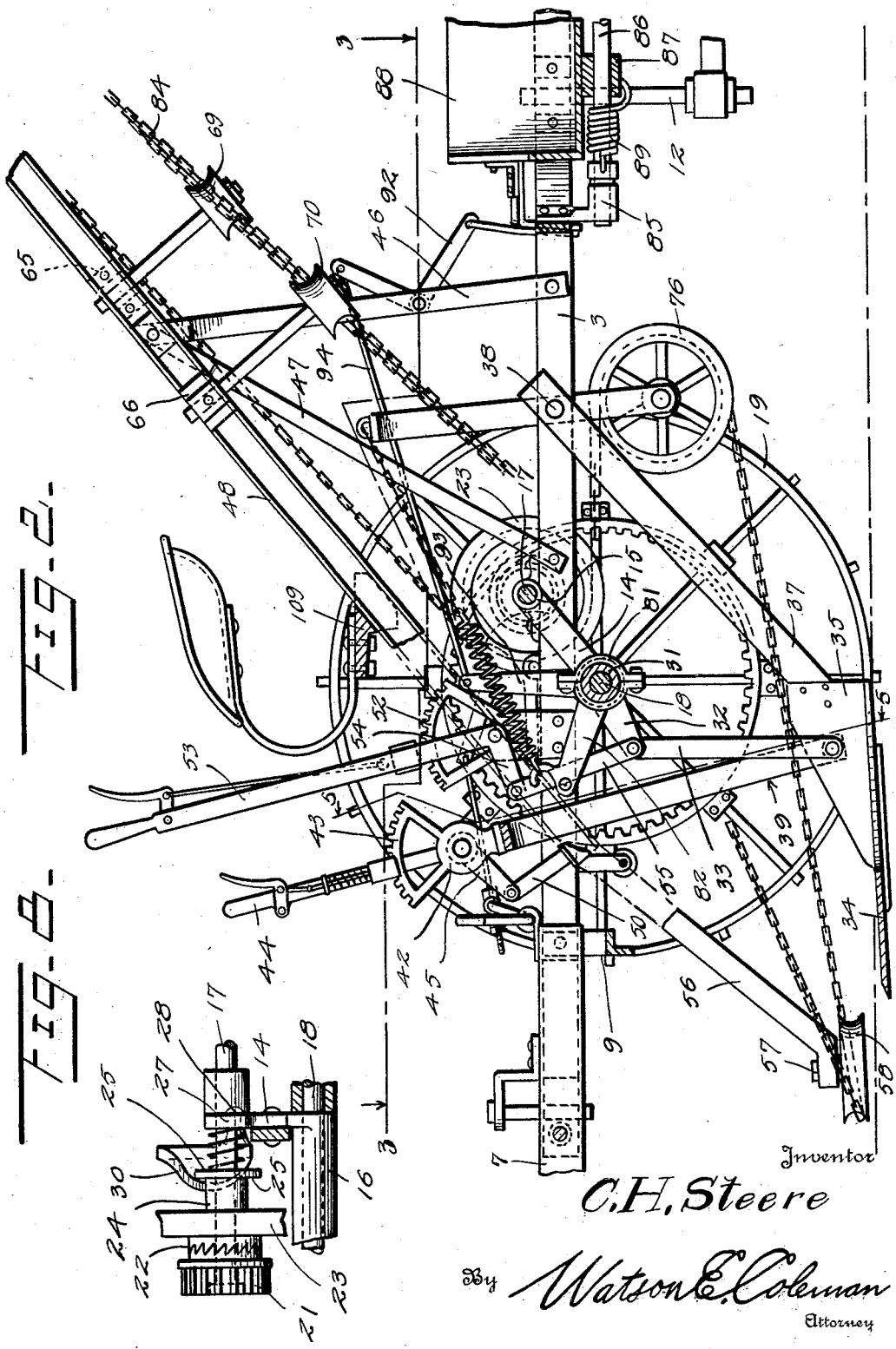
Figure 2 is a vertical, central longitudinal section of the machine.

The forward end of the beam 48 carries the forwardly extending and diverging sheave wheel carrying arms 56, each of which carries a substantially vertically disposed pivot pin 57 which in turn carries a sheave wheel 58, the wheel being disposed beneath the arm, as illustrated in Figures 1 and 2.

Arranged upon opposite sides of the beam 48, adjacent the forward end, are the bearings 59 and 60 which carry the arms 61 and 62 which in turn carry upon their lower ends the offset sheave wheels 63 and 64.

Adjacent the upper end of the beam 48 are two more bearings 65 and 66 which carry the arms or shafts 67 and 68 which in turn support the sheave wheels 69 and 70. These sheave wheels 69 and 70 are also offset with respect to the beam 48 or, in other words, in staggered relation, the wheel 69 being substantially in alignment with the wheel 63 at the lower end of the beam, while the wheel 70 is substantially in alignment with the wheel 64.

Upon the upper end of the beam 48 there is secured transversely thereof the bar 71, each end of which is turned under, as indicated at 72, to provide a support for a sheave wheel 73, a suitable brace arm 74 being disposed between each outer end of the bar 71 and the beam 48 to brace the bar.

Mounted at each side of the frame structure 1, upon each of the bolts 38, is a normally substantially vertical oscillatable arm 75. At the lower end of each arm 75 there is pivotally supported a sheave wheel 76 upon a horizontally disposed pivot 77. The upper end of each arm 75 is turned inwardly, as indicated at 78, and to the inner end of each of these inturned portions 78 is attached one end of a chain 79, to the other end of which is attached one end of a spring 80.

Mounted for free oscillation about the sleeve 31, adjacent each end thereof, is a split ring 81 which carries an arm 82. The arms 82 of the rings mounted upon this sleeve are connected by a transverse bar 83 which passes across the frame beneath and in contact with the beam 48. The other end of each of the springs 80 is connected with the free end of the adjacent arm 82, as illustrated in Figures 1, 2 and 3.

It will be seen from the foregoing that upon each side of the beam 48 there is located a set of sheave wheels. One set comprises the wheels 64 and 70 with all of the wheels 23, 58, 73 and 76 upon the same side of the beam. It naturally follows that the remaining wheels 23, 58, 73 and 76 with the wheels 63 and 69 constitute the other group.

Each group of chain supporting sheave wheels has associated therewith an endless carrier chain 84 and these chains meet and run in side by side relation between the wheels 64 and 69. In other words, the chain 84, upon the right hand side of the machine, travels forwardly and downwardly over the sheave wheel 23, by which it is driven, back about and downwardly over the adjacent idler sheave wheel 76 and from there forwardly to and about the adjacent idler sheave wheel 58. From the wheel 58 this chain, upon the right side of the machine, passes inwardly toward the center of the machine, to and about the idler wheel 64 and from there obliquely of the machine to and about the adjacent idler wheel 63. It then passes rearwardly and upwardly to the adjacent side of the idler wheel 70, across the inner side of the idler wheel 69 and then rearwardly and outwardly to the offset back idler wheel 73 which it passes about and forwardly and downwardly again to the drive wheel 23. On the left hand side of the machine the other chain 84 travels in the same manner.

It will thus be seen that the chains converge adjacent the center of the machine, at the face of the centrally located wheel 64, and from this wheel the chains pass together over the wheel 63 and rearwardly to the wheel 70 where they begin to separate, the chain upon the right side of the machine passing on over the wheel 69 while the one upon the left side of the machine passes directly rearwardly and outwardly to the left hand wheel 73.

Mounted upon the cross member 10 of the machine frame, upon the longitudinal center of the machine, is a socket 85 which receives and supports one end of the longitudinally extending shaft 86. This shaft 86 passes through a pair of bearings 87 which are secured to the bottom of the pan 88 into which the collected peanut plants are dropped when they are released by the carrier chains 84. This pan, with the bearings 87, oscillates upon the shaft 86, the side of the pan opposite the beam 2 of the machine frame being open, as illustrated, so that the contents thereof may be readily discharged therefrom.

Surrounding the shaft 86, between the forward bearing 87 and the support 85, is a coil spring 89, one end of which is secured to the adjacent bearing 87 while the other end is secured to a collar which is made fast to the support 85 so that it will not turn. When the pan 88 is oscillated to a dumping position this spring 89 will be twisted and thus placed under tension and it will therefore operate to return the pan to normal horizontal position.

The back of the pan normally rests against the rearwardly extending jointed portions of the beams 2 and 3.

Mounted upon the forward side of the pan 88 is an arm 90 which extends laterally of the machine and this arm is connected, at its outer end, by the link 91 with the free end of one arm of a bell crank 92, this bell crank being mounted upon a suitable portion of the machine as, for example, upon the adjacent support 46.

Mounted loosely upon the axle shaft bearing 16 upon the same side of the machine as the bell crank 92 is a normally upright arm 93. The upper end of this arm is joined with the free end of the other arm of the bell crank 92 by the rod 94.

The arm 93 is mounted, as shown in Figure 3, relatively close to the adjacent wheel 19 and there is pivotally supported upon the outer face of this arm, adjacent the upper end thereof, the oscillatable pawl member 95. This pawl has a bill 96 and an arm 97 and the bill 96 is so located with respect to the adjacent ring gear 20 that, when the pawl is oscillated in one direction, it will move into engagement with the teeth of the ring gear and thus lock the gear and the arm 93 together so that they will both turn about the axle 18. It will thus be seen that when this occurs a pull will be exerted upon the rod 94 and this results in the actuation of the bell crank 92 and the oscillation of the pan 88 to dumping position.

A spring 98 connects the bill 96 of the pawl with the arm 93 and normally keeps the bill of the pawl out of engagement with the ring gear 20.

Mounted upon the forward part of the machine frame, preferably upon the cross beam 4, is a bearing 99 in which is oscillatably positioned a short shaft 100, one end of which is turned up to form the foot crank lever 101 and the pedal 102, while the other end is turned up to form the crank arm 103.

Upon this arm 103 there is oscillatably mounted a sleeve 104 and there extends through this sleeve a rod or wire 105, which is connected, as shown in Figure 6, with the free end of the pawl arm 97. The forward end of the rod or wire 105 is threaded to receive the nut 106, which limits the movement of the rod backwardly through the sleeve 104 but does not interfere with its forward sliding movement through the sleeve. It will thus be seen that in order to engage the bill 96 of the pawl between a pair of teeth in the adjacent ring gear, the operator of the machine presses forwardly upon the pedal 102 to pull downwardly on the arm 97, thus moving the bill into the desired position and placing the spring 98 under tension.

As the arm 93 and the pawl 95 swing forwardly and downwardly with the ring gear 20, after the pawl has been moved into engagement with the gear, as described, the arm 97 of the pawl reaches the point where it comes into contact with a stop member in the form of a roller 107 mounted upon a suitable arm 108 which is carried by the adjacent beam of the frame. This causes the pawl 95 to be oscillated to disengage the bill from the teeth 20 and the spring 98 then acts to hold the bill out of engagement with the ring gear teeth and allows the pan 88 to swing back to horizontal position and at the same time pull the arm 93 and the parts connected therewith back to the position shown in Figure 6.

The beam 48 has mounted thereon the block 109 which is adjustably held in position by a set screw 110. This block carries a resilient, substantially U-shaped support 111 upon which is mounted the seat 112.

From the foregoing description it will be readily seen that with the machine herein described, peanuts may be readily hervested by driving the machine along the rows of the plants so that the plow 34 will cut the roots of the same at the proper distance below the ground surface. The depth at which the plow works may be readily regulated by means of the lever 53 and it will be seen that as the lever 53 is shifted to increase the depth at which the plow works, the relation of the pick-up chains 84 to the ground will also be varied, particularly those portions of the chains which pass over the plow and converge at the center of the machine. As the machine moves along the plants will be received, as they are cut, between the convergent portions of the chains and will be held therebetween until the plants have reached a point over the bin or pan 88 where they will be released and will fall into the pan.

The adjustment of the chains with respect to the ground may be varied without shifting the plow by oscillating the lever 44. This will raise or lower the forward end of the beam 48 and consequently will also raise or lower the convergent portions of the chains above the plow.

Should a large group of plants enter between the portions of the chains which pass inwardly from the rollers 58, so that there would be danger of the stalks being cut as the chains come together as they pass about the sheaves 63 and 64 so as to drop the peanut bearing roots to the ground, the increased tension applied to the chains by this extra large bulk of material will cause the sheaves 76 to be pulled forward by oscillating the supporting arms 75 upon which they are mounted.

This will in turn create a pull upon the springs 80 and pull upwardly on the arms 82 and the bar 83. As the bar 83 is raised it will bear against the forward end of the beam 48 and raise this also, thereby lowering the rear end of the beam and slacking the chains. Thus the necessary amount of looseness will be imparted to the chains to prevent their cutting the plants as they pass about the sheaves 63 and 64.

Having thus described the invention, what is claimed is:

1. A plant harvesting machine of the character described, comprising a wheel supported frame, a plow member carried by the frame to travel beneath the surface of the ground to sever a plant from its roots, a receptacle carried by the frame behind said plow, a conveyor mechanism consisting of a pair of flexible elements traveling over a path overlying the plow and the receptacle, said elements being mounted to move into side by side relation over the plow to grip the stalk of a plant and to travel in such relation to a point terminating above said receptacle, and means for vertically adjusting said flexible elements independently of and relative to said plow for the accommodation of plants of various heights.

2. A plant harvesting machine of the character described, comprising a wheel supported frame, a plow member carried by the frame and having a relatively broad flat blade designed to travel beneath the surface of the ground to sever a plant from its roots, a receptacle carried by the frame behind said plow, a conveyor mechanism consisting of a pair of flexible elements traveling over a path overlying the plow and the receptacle, said elements being mounted to move into side by side relation over the plow to grip the stalk of a plant and to travel in such relation to a point terminating above said receptacle, a coupling between said plow and said conveyor mechanism, and a single operating means whereby said plow and conveyor mechanism may be simultaneously vertically adjusted.

3. A plant harvesting machine of the character described, comprising a wheel supported frame structure, a plow carried by said structure and adapted to travel at a regulated depth beneath the surface of the ground, a receptacle carried by said frame rearwardly of said plow, a plant pick-up and conveying mechanism comprising a support mounted on the frame, a pair of endless flexible elements and supporting sheave wheels carried by said support and having said flexible elements passing thereover, said flexible elements extending from a point forwardly of the plow to a point above the receptacle, said wheels being arranged to bring said flexible elements into convergent relation above the plow and to maintain portions of the elements constantly in side by side relation while traveling rearwardly from the plow to a point above the receptacle, means for driving said pick-up and conveyor mechanism from the machine wheels, other sheave wheels carried by the machine frame, and a pivotal support for the pick-up and conveyor mechanism, whereby the said mechanism may be oscillated to slacken said flexible elements, the said flexible elements also passing over the last mentioned sheaves.

4. In a plant harvesting machine of the character described, a wheel supported frame structure, a plow carried by the structure, a beam arranged above the structure and extending upwardly and rearwardly with respect thereto and pivotally supported intermediate its ends thereon, a shaft carried by the structure frame and having driving connection with a wheel of the structure, a driving sheave wheel mounted upon each end of said shaft, an idler sheave wheel mounted adjacent each drive sheave, means supporting each idler sheave for movement longitudinally of the structure, a plurality of sheave wheels carried by said beam, a pair of endless flexible elements each engaging about a drive sheave and an idler sheave and passing over certain of the sheaves of said beam, said beam supported sheaves being arranged to bring said flexible elements into convergent relation above the plow and to run the elements in side by side relation for a distance longitudinally of the structure and separating the elements at a point adjacent the rear of said beam, a receptacle disposed beneath the separated portions of the elements, and resilient means normally holding said idler sheaves in a predetermined position to take up slack in the elements.

5. In a plant harvesting machine of the character described, a wheel supported frame, a shaft extending transversely of the frame and carrying an arm, a plow designed to travel beneath the surface of the ground and having pivotal connection with said frame, a link connection between said arm and said plow, means for oscillating said arm to facilitate the raising of the plow, a receptacle carried by the frame rearwardly of the plow, a pick-up and conveyor mechanism carried by the frame and extending over the plow and the receptacle, said mechanism being designed to pick up plants severed by the plow and convey the same to the receptacle, and means for driving the pick-up mechanism.

6. In a plant harvesting machine of the character described, a wheel supported frame, a shaft extending transversely of the frame and carrying an arm, a plow designed to travel beneath the surface of the ground and having pivotal connection with said frame, a link connection between said arm and said plow, means for oscillating said arm to facilitate the raising of the plow, a receptacle carried by the frame rearwardly of the plow, a pick-up and conveyor mechanism carried by the frame and extending over the plow and the receptacle, said mechanism being designed to pick up plants severed by the plow and convey the same to the receptacle, and means for driving the pick-up mechanism, said pick-up mechanism including a pair of endless chains supported to be brought into convergent relation over said plow and to travel in side by side relation from the point of convergence to a point above said receptacle.

7. In a plant harvesting machine of the character described, a wheel supported frame, a shaft extending transversely of the frame and carrying an arm, a plow designed to travel beneath the surface of the ground and having pivotal connection with said frame, a link connection between said arm and said plow, means for oscillating said arm to facilitate the raising of the plow, a receptacle carried by the frame rearwardly of the plow, a pick-up and conveyor mechanism carried by the frame and extending over the plow and the receptacle, said mechanism being designed to pick up plants severed by the plow and convey the same to the receptacle, means for driving the pick-up mechanism, said pick-up mechanism including a pair of endless chains supported to be brought into convergent relation over said plow and to travel in side by side relation from the point of convergence to a point above said receptacle, and means whereby upon the entrance of an excessive bulk of plants between the side by side portions of the chains, the pick-up mechanism will be shifted to put a slack into the chains.

8. A plant harvesting machine of the character described, comprising a wheel supported frame, a plow oscillatably supported for vertical movement on said frame, a beam member pivotally supported intermediate its ends on said frame and extending from a point above said plow at an upward and rearward inclination, a pair of endless conveyor chains disposed at opposite sides of the longitudinal center of the machine beneath said beam, supporting sheave wheels for said chains carried by said beam whereby said chains are guided inwardly in convergent relation over the plow and run in side by side relation for a distance longitudinally of the beam and then diverge, a receptacle carried by the frame beneath the divergent portions of the chains, driving sheave wheels each having one of said chains passing thereover, an idler sheave wheel, an oscillatable arm supporting said idler wheel, each idler wheel having a chain passing thereabout, a pair of oscillatably supported arms, a resilient element connecting each of said arms with an idler wheel support whereby slack in said chains is taken up, a bar member connecting said arms and engaging beneath the forward end of said beam, and means for driving said driving sheaves.

9. A plant harvesting machine of the character described, comprising a wheel supported frame, a plow oscillatably supported for vertical movement on said frame, a beam member pivotally supported intermediate its ends on said frame and extending from a point above said plow at an upward and rearward inclination, a pair of endless conveyor chains disposed at opposite sides of the longitudinal center of the machine beneath said beam, supporting sheave wheels for said chains carried by said beam whereby said chains are guided inwardly in convergent relation over the plow and run in side by side relation for a distance longitudinally of the beam and then diverge, a receptacle carried by the frame beneath the divergent portions of the chains, driving sheave wheels each having one of said chains passing thereover, an idler sheave wheel, an oscillatable arm supporting said idler wheel, each idler wheel having a chain passing thereabout, a pair of oscillatably supported arms, a resilient element connecting each of said arms with an idler wheel support whereby slack in said chains is taken up, a bar member connecting said arms and engaging beneath the forward end of said beam, means for driving said driving sheaves, hand lever operated means carried by the frame for vertically adjusting said plow, and hand lever operated means supported by the plow for oscillating said beam.

10. A peanut harvesting mechanism, comprising a wheeled structure, a plow carried thereby and vertically adjustable relative thereto, a plant pick-up and conveying mechanism mounted on the structure for vertical adjustment, means for vertically adjusting the plow and mechanism as a unit, means for vertically adjusting the pick-up mechanism independently of the plow, and a receiving receptacle arranged for the reception of plants discharged from the pick-up mechanism.

11. In a peanut harvester, a wheel supported frame, a beam oscillatably mounted intermediate its ends on said frame and normally disposed at a forward and downward inclination, a receptacle disposed beneath the rear end of the beam, a plant pick-up mechanism carried by the beam and arranged and designed to engage plants at a point adjacent the ground and convey the same to the raised end of the beam for discharge into said receptacle, a plow arranged to work in the ground adjacent the lower end of said pick-up mechanism, means for supporting said plow from the frame, and means for oscillating said beam for the adjustment of the pick-up mechanism relative to the ground.

12. In a peanut harvester, a wheel supported frame, a beam oscillatably mounted intermediate its ends on said frame and normally disposed at a forward and downward inclination, a receptacle disposed beneath the rear end of the beam, a plant pick-up mechanism carried by the beam and arranged and designed to engage plants at a point adjacent the ground and convey the same to the raised end of the beam for discharge into said receptacle, a plow arranged to work in the ground adjacent the lower end of said pick-up mechanism, means for supporting said plow from the frame, means for oscillating said beam for the adjustment of the pick-up mechanism relative to the ground, pivotal supporting means for said plow, connecting means between the plow and the beam, and means for oscillating the plow and beam together.

13. In a peanut harvester a wheel supported frame, a beam pivotally mounted on said frame intermediate its ends and normally disposed at a forward and downward inclination, a receptacle disposed beneath the upper end of said beam, a plant pick-up and conveying mechanism comprising a pair of endless chains and supporting pulleys therefor, means for constantly moving said chains over the supporting pulleys, said chains being arranged to move together through a path beginning adjacent the ground and to the forward end of said beam and extending toward the rear of said beam and terminating over said receptacle, to pick up plants from the ground and drop the same into the receptacle, an oscillatable member mounted on the frame at each side thereof, a pulley carried by each oscillatable member and having a chain trained thereover, and resilient means engaging each of said oscillatable members and normally urging the same to swing in one direction to maintain the adjacent chain in a taut condition.

14. In a peanut harvester a wheel supported frame, a beam pivotally mounted on said frame intermediate its ends and normally disposed at a forward and downward inclination, a receptacle disposed beneath the upper end of said beam, a plant pick-up and conveying mechanism comprising a pair of endless chains and supporting pulleys therefor, means for constantly moving said chains over the supporting pulleys, said chains being arranged to move together through a path beginning adjacent the ground and to the forward end of said beam and extending toward the rear of said beam and terminating over said receptacle, to pick up plants from the ground and drop the same into the receptacle, and means normally operating to take up slack in each of said chains and to oscillate said beam for the slackening of the chains upon the engagement of a large body therebetween.

15. In a peanut harvester a wheel supported frame, a beam pivotally mounted on said frame intermediate its ends and normally disposed at a forward and downward inclination, a receptacle disposed beneath the upper end of said beam, a plant pick-up and conveying mechanism comprising a pair of endless chains and supporting pulleys therefor, means for constantly moving said chains over the supporting pulleys, said chains being arranged to move together through a path beginning adjacent the ground and to the forward end of said beam and extending toward the rear of said beam and terminating over said receptacle, to pick up plants from the ground and drop the same into the receptacle, an oscillatable member mounted on the frame at each side thereof, a pulley carried by each oscillatable member and having a chain trained thereover, an oscillatable element disposed beneath the lower end of said beam, and a contractile spring connecting each of said oscillatable members with said oscillatable element whereby the oscillatable members will be normally caused to take up slack in the chains and said beam will be caused to oscillate through the action of said oscillatable member thereagainst upon the swinging of the oscillatable elements in one direction.

16. In a peanut harvester, a wheel supported frame, a beam member disposed longitudinally of said frame and pivotally mounted intermediate its ends thereon and further normally disposed at a forward and downward inclination, a receptacle carried by the frame beneath the rear elevated end of said beam, a plant pick-up and conveying mechanism carried by said beam and arranged to move in relatively close proximity to the ground to engage plants thereon and to convey the plants to the elevated end of the beam for discharge into said receptacle, a relatively broad flat plow disposed beneath the forward end of said pick-up mechanism to work beneath the surface of the ground, means pivotally connecting the plow with said frame whereby the plow may be vertically adjusted, a frame structure carried by said plow and having the forward end of the beam extended therethrough, a lever pivotally mounted upon said last frame structure and having link connection with the forward end of the beam whereby the said forward end of the beam may be raised or lowered to adjust the plant pick-up mechanism independent of the plow, and a second lever pivotally mounted upon the first mentioned frame and having link connection with the plow whereby the plow and beam may be vertically simultaneously adjusted.

In testimony whereof I hereunto affix my signature.

CHARLES H. STEERE.